Jan. 26, 1954          S. S. JOHNS          2,667,062
CONVEYER LINE HANDLING AND TESTING OF MANUFACTURED ARTICLES
Filed Sept. 20, 1950          7 Sheets-Sheet 1

INVENTOR.
STANLEY S. JOHNS
BY
*Cushman, Darby & Cushman*
ATTORNEYS

Jan. 26, 1954 S. S. JOHNS 2,667,062
CONVEYER LINE HANDLING AND TESTING OF MANUFACTURED ARTICLES
Filed Sept. 20, 1950 7 Sheets-Sheet 7

INVENTOR.
STANLEY S. JOHNS
BY
Cushman, Darby & Cushman
ATTORNEYS

Patented Jan. 26, 1954

2,667,062

UNITED STATES PATENT OFFICE 2,667,062

CONVEYER LINE HANDLING AND TESTING OF MANUFACTURED ARTICLES

Stanley S. Johns, Baltimore, Md., assignor to Rheem Manufacturing Company, Richmond, Calif., a corporation of California Application September 20, 1950, Serial No. 185,825

1 Claim. (Cl. 73—40)

This invention relates to apparatus for conveyor line handling and testing of manufactured articles.

In conveyor line methods of manufacture it is often essential that the articles being processed be automatically changed from one position on the conveyor to another and also that the articles be intermittently stopped for various operations, such as pressure testing. By my invention described in this specification, I provide an efficient means for carrying out these or similar objectives in a manner which permits rapid operation of the conveyor system. My invention will be described primarily in connection with the processing of cylindrical containers commonly known as drums, but it will be understood that the invention applies to many other types of manufactured articles.

In the fabrication of cylindrical steel drums, it is the usual practice to test the drum for leaks after welding and seaming operations have been completed. Since the seaming operation is often performed while the cylindrical drum is in a horizontal position, and in such position is rolled along conveyor guides, it is a first operation of my invention to upend the drums to a vertical position. The drums in the upend position are placed upon a conveyor and move to a testing apparatus. The testing apparatus generally comprises a means to stop the drum and to then apply pressure to the interior thereof. While the pressure is applied, a solution such as a soap solution having high surface tension is applied to the exterior of the seams and any leaks observed, as rising bubbles. After the test is completed, the drums are then automatically moved down the conveyor, or may be rejected to the rear.

It is therefore a primary object of my invention to provide a means for efficiently testing containers in a conveyor line operation.

It is a further object of my invention to provide means for automatically upending objects on a conveyor line.

It is a further object of my invention to provide means for upending containers on a conveyor line and for automatically testing the containers.

It is a further object of my invention to automatically stop objects moving along a conveyor line for testing.

It is a further object of my invention to provide means for rapidly applying test pressure to a container while it is stopped on a conveyor line.

Further objects and the entire scope of my invention will be apparent from the following detailed description and from the appended claim. It will be understood that the following detailed description is made only for purposes of illustration and is not intended to limit my invention.

The following description may be best understood with reference to the attached drawings in which:

Figure 6 shows an end view of the pressure testing apparatus.

Figure 1:
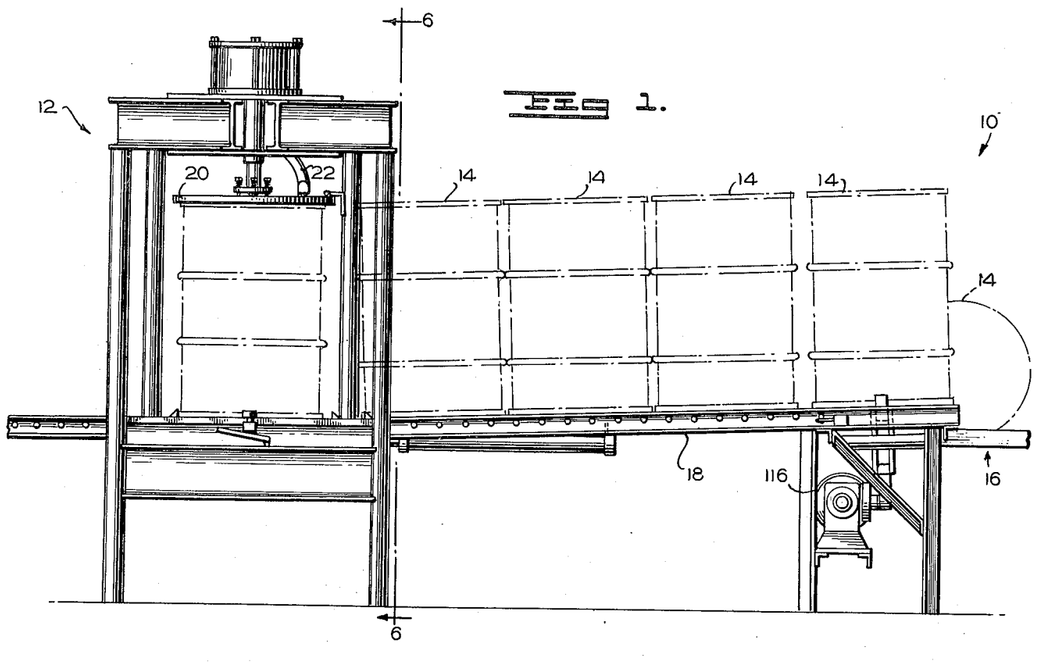
Figure 1 shows the general layout of my apparatus.

In Figure 1, numeral 10 indicates generally an upending apparatus, and the numeral 12 indicates generally a pressure testing apparatus. Cylindrical containers 14, such as steel drums or the like, arrive at the upending apparatus 10 by rolling on the conveyor section 16. Upon arriving at the apparatus 10, the drums are upended into a vertical position, as shown, and placed upon a roll conveyor 18. The drums then move under force of gravity to the testing apparatus 12 where they are intermittently moved into a central position, and a sealing plate 20 is lowered to engage the top of the container. Test pressure is then introduced through the plate 20 by means of hose 22 and pressure thus introduced into the container through a suitable aperture located in the upper end thereof. In steel drums, this aperture would be the open filling hole. While the pressure is being applied, the solution of soapy fluid is sprayed on the exterior of the seams of the container and any leaks readily observed. The fluid applying means is not shown in Figure 1 but will be described in connection with other figures. It will, of course, be understood from the following that the conveyor sections 16 and 18 may each be power driven rather than of the gravity type. It will further be apparent that the upending apparatus 10 may be dispensed with if the drums arrive in an upended position.

Figure 2:
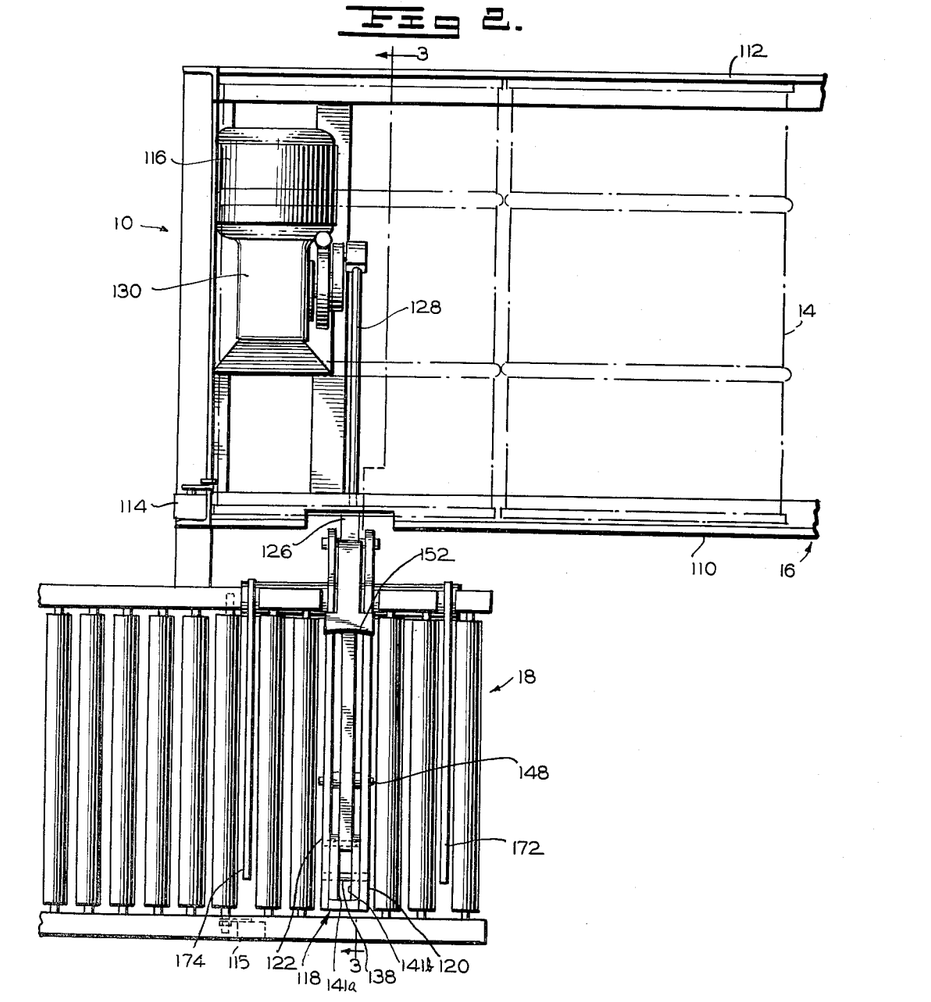
Figure 2 shows a plan view of the upending apparatus.
Figure 3:
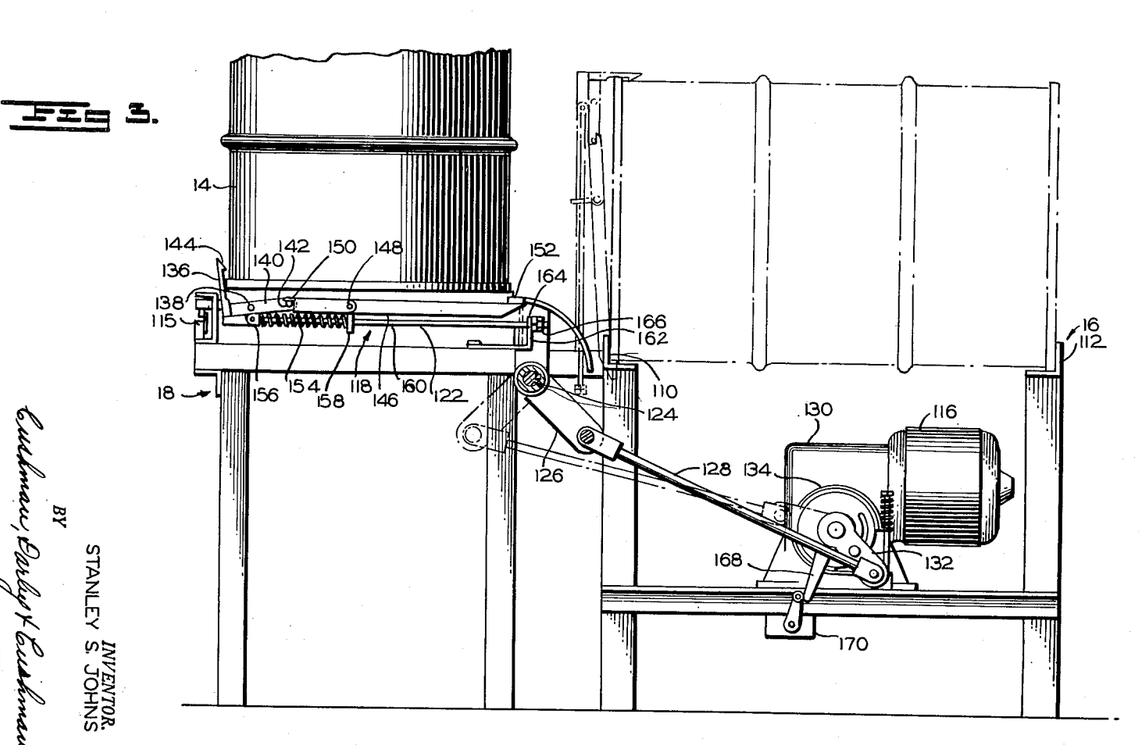
Figure 3 is an end view taken along the line 3—3 of Figure 2.

The details of the upending apparatus 10 can be further understood with additional reference to Figures 2 and 3. The conveyor section 16 is comprised of two L-shaped side rails 110 and 112 upon which the drums 14 are adapted to roll. These rails are supported by any suitable means. When a drum has moved to the extreme left end of the rails 110 and 112, as shown in Figure 2, a limit switch 114 is operated by contact with the drum. The operation of switch 114 causes a motor 116 to be energized and upending apparatus to be operated through one cycle.

The upending operation is performed under the control of the motor 116 by means of a raising arm indicated generally at 118 which comprises two side arms 120 and 122, these side arms being mounted for pivotal movement on a shaft 124. A crank arm 126 is also keyed to the shaft 124 and this crank arm is connected to the drive motor 116 by means of an interconnecting rod 128. When the motor 116 is operated, the crank arm 126 is caused to undergo one cycle of oscillation which moves the raising arm 118 from a horizontal to a vertical position and return. This cycle of operation is caused by the arrangement of a gear box 130 operated at its input end by the motor 116, and operating an output crank 132 in such fashion that this arm 132 will undergo one complete revolution and automatically stop each time the limit switch 114 is closed. The gear box 130 is further characterized by the provision of a brake means 134 which brings the moving parts to a stop when the motor is de-energized.

When the raising arm 118 is in the vertical or chain line position in Figure 3, clamp means mounted on the arm 118 is adapted to grasp the drum about its lower ring or chime. An outer clamp member 136 is pivotally mounted on a transverse pin 138 which extends between and is mounted in the side arms 120 and 122. The clamp member 136 has an arm 140 extending inwardly of the pin 138 and is equipped at its inner end with an aubtment pin 142. The extending arm 140 of the clamp member 136 is made up of two spaced arms 141a and 141b and the pin 142 extends therebetween. The clamp 136 at its outer end is provided with a beveled shoulder 144 which, when in clamped position, may engage the lower rim of the drum 14, as shown in Figure 3.

An inner clamp member 146 is also pivotally mounted on the raising arm 118 by means of a pin 148 which extends between the said arms 120 and 122. The inner clamp member 146 at its outer end is provided with an overhanging shoulder 150 which overlies the pin 142 which interconnects the said arms 141a and 141b of clamp member 136. The clamp member 146 at its innermost end is provided with a shoulder member 152 which is arranged to engage the lower edge of the drum 14.

The clamp members 136 and 146 are normally urged into a clamping position by means of a spring 154, this spring extending between a depending abutment 156 on clamp member 136 and an abutment 158 on the clamp member 146. An operating rod 160 is pivotally attached to the abutment 156 and extends through the spring 154 and through an aperture in abutment 158 to a position adjacent an operating stop 162. Both the operating stop 162 and the shaft 124 are mounted on a suitable support comprising the roll conveyor 18. The operating stop 162 is provided with a vertical slot extending from its upper edge 164.

In the apparatus as thus far described, it will be apparent that when the raising arm 118 is pivoted about the axis of the shaft 124 into its vertical position (chain line, Figure 3), the spring 154 will expand and cause the clamp members 136 and 146 to rotate clockwise and counterclockwise, respectively, about the pins 138 and 148 and permit the shoulders 144 and 152 to clamp on the lower rim of a horizontal drum on the conveyor section 16. The bevel on the shoulder 144 will permit the clamping action to take place in cooperation with the momentary yielding of the spring 154. When the raising arm 118 is then rotated counterclockwise (Figure 3), the clamping members will remain engaged with the drum until the rod 160 has re-entered the slot in the upper surface of the operating stop 162. The rod 160 is provided at its outer end with adjustable stop means 166 and the engagement of the stop means 166 with the stop 162 will cause the clamp 136 to be rotated counterclockwise. When clamp 136 rotates counterclockwise, it moves out of clamping engagement with the drum 14 and simultaneously by action of the pin 142 causes clamp 146 to rotate clockwise to disengage the shoulder 152. With the raising arm 118 in its full horizontal position and the clamps 136 and 146 forceably disengaged, the motor 116 is automatically stopped by the engagement of a limit arm 168 with a limit switch 170 located adjacent the gear box 130. The switch 170 will yield, however, to permit continued rotation of arm 132 when the motor is otherwise energized.

A complete cycle of operation of the upending apparatus 10 will now be traced. Assuming the conveyor system initially empty, the first container which appears on the conveyor section 16 will operate the limit switch 114 to energize the motor 116, notwithstanding the open circuit in the limit switch 170. This may be through any suitable relay system. The gear box crank arm 132 will then rotate clockwise and cause crank arm 126 to move raising arm 118 into its vertical position. This vertical position will be reached at the extreme throw of the crank arm 132. The spring 154 will be free to act and the clamp members 136 and 146 will engage the lower rim of the container. As the arm 132 continues in its clockwise rotation, the arm 118 will be returned to its horizontal position, bringing with it the container. As the arm reaches its horizontal position, the stop means 166 of the operating rod 160 will cause the members 136 and 146 to underclamp and the container may be moved away on the conveyor 18. At substantially this point, the arm 168 will engage the limit switch 170 to open the circuit to the motor 116. It will be understood that the limit switches 114 and 170 are connected in parallel, and the switch 170 is normally closed and the switch 114 normally open. With this connection, a container will cause 114 to energize the motor and switch 170 will be closed by the time the removal of the container has permitted 114 to reopen.

Two supporting arms 172 and 174 are also keyed to the shaft 124 and serve to additionally support the container as it is upended. The conveyor 18 is shown as a conventional gravity roll conveyor and will be described in greater detail in connection with the testing apparatus. The inner side rail of the conveyor 18 may be cut away as necessary to accommodate the raising arm 118 and the said arms 172, 174.

Figure 4:
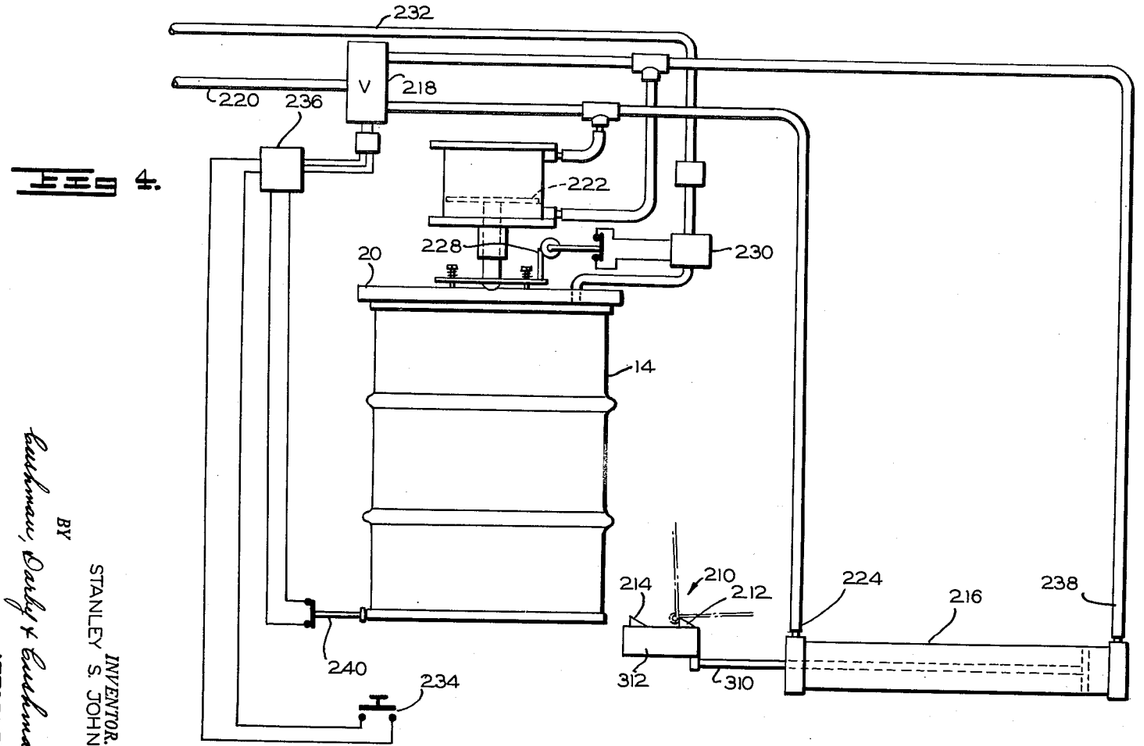
Figure 4 is a diagrammatic showing of my pressure testing apparatus.

The pressure testing apparatus 12 will now be described in detail. Referring first to Figure 4, the container 14 is adapted to be located at a predetermined position along the conveyor 18 by means of a reciprocating shuttle arrangement indicated generally at 210. This shuttle is equipped with injector and ejector dog members 212 and 214, respectively, which remove a testing container and position a following container on each operation. The shuttle is shown as pneumatically actuated by a piston and cylindrical arrangement indicated at 216. With a container positioned as shown in Figure 4, a valve 218 is operated to one of its two positions to permit air pressure from a supply line 220 to be directed simultaneously to the upper surface of a piston 222 and to the resetting entrance 224 of the shuttle piston arrangement 216. The sealing plate 20 is mounted for movement with the piston 222 and this plate is accordingly pressed against the upper end of the container. When the plate 20 is thus engaged with the container, a switch means 228 is operated to open a valve 230 to permit test pressure to be supplied through the plate 20 from a source 232 of test pressure. While the end of the container may be normally installed when this test is made, the pressure will, nevertheless, enter the interior of the container by means of any suitable opening in the end thereof. This will be more fully discussed below. While the pressure is supplied, means are provided (not shown in Figure 4) for applying a soapy solution to seams and other areas of the container which are to be inspected for leaks. When the test is completed, a switch 234 is either manually or automatically operated to cause the relay 236 to shift the valve 218 into its second position. In this second position, pressure from source 220 will then be applied beneath the piston 222 and at the operating end 238 of the shuttle piston arrangement 216. This distribution of pressure will cause the plate 20 to be disengaged from the container and will simultaneously cause the switch 228 to cut off the test pressure through valve 230. The shuttle 210 will also be reciprocated to the left (Figure 4), and ejector dog 214 will cause the container to be removed along the conveyor line. The injector dog 212 will be in engagement with the inside of the lower rim of a following container and in the movement of the shuttle the said following container will be brought into position beneath the plate 20. When in position, the container will operate a limit switch 240 to reshift the valve 218 into its first position by means of the relay 236, this causing the shuttle to reset and the test pressure to be applied as previously explained. The limit switch 240 is adapted to be moved out of the path of the container while the latter is being ejected. The valve used may be any conventional solenoid valve.

Figure 5:
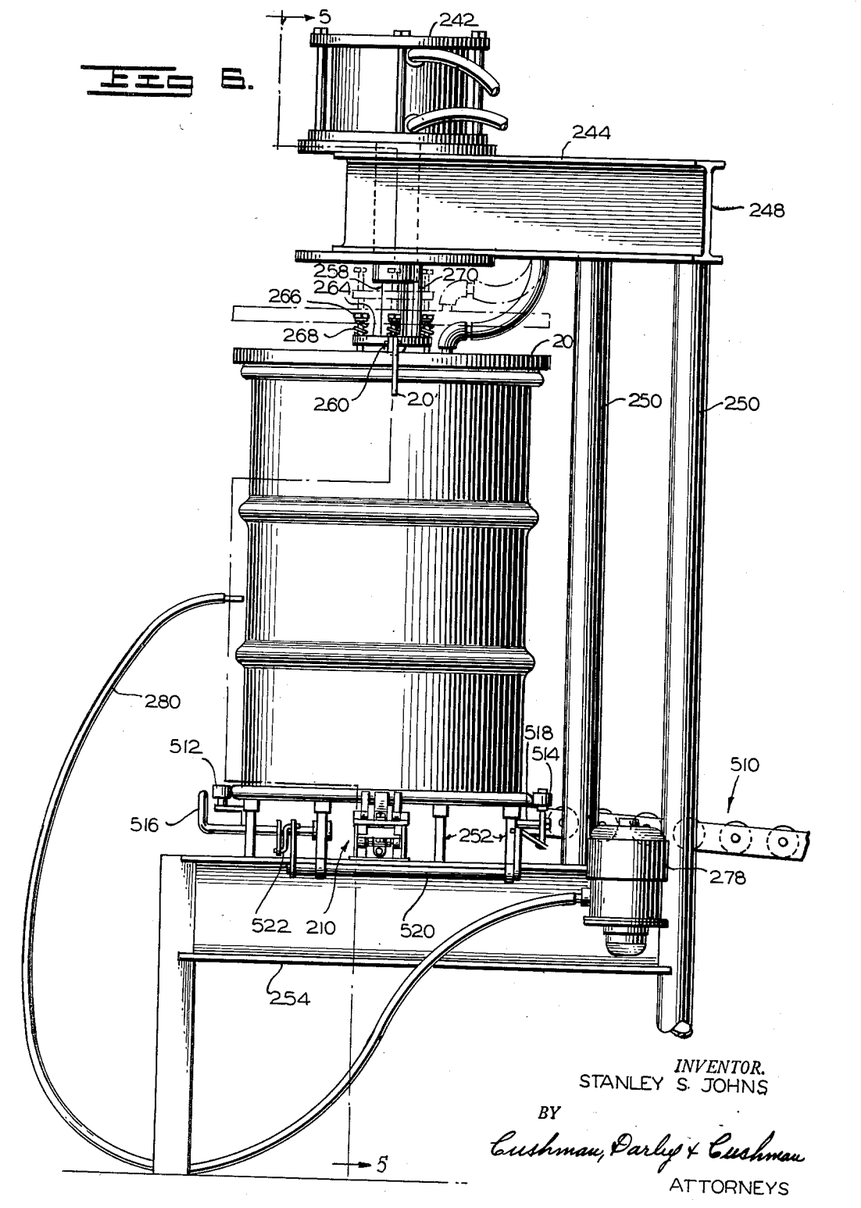
Figure 5 shows a side view in partial section of the pressure testing apparatus, taken along the line 5—5 of Figure 6.

The structural features of the air test apparatus can be more fully understood with reference to Figures 5 and 6. From these figures it will be apparent that the piston 222 is contained in a cylindrical housing 242 which is mounted on converging I-beams 244 and 246. These beams when combined with a rear I-beam 248 comprise a triangular structure which is supported in cantilever fashion upon posts 250.

The roll conveyor 18 is positioned to supply containers beneath the just-mentioned cantilever support structure, and the previously mentioned shuttle arrangement is adapted to move the containers from the conveyor 18 to a position beneath the plate 20 in the following manner: Referring to Figure 6, a plurality of spaced slide rails 252 are mounted parallel to the motion of the containers and permit the shuttle arrangement 210 to operate therebetween. The rails 252 are mounted upon transverse I-beams 254 which extend transverse to the direction of movement of the containers. These transverse means 254 may be supported in any suitable manner. Guide rails 256 may be employed to restrict the container from sidewise movement on the rails 252, or below described rollers used for this purpose.

The plate 20 is pivotally mounted at the lower end of a piston rod 258 which extends from the piston 222. The pivotal mounting comprises a hemisphere 260 mounted on the rod 258 which seats in a detent 262 in the plate 20. The piston rod 258 is further equipped with a flange plate 264 having apertures therethrough which receive studs 266 mounted in the plate 20. Springs 268 extend between the heads of the studs 266 and the flange plate 264 and serve to retain the hemisphere 260 in the detent 262. It will be obvious that this arrangement permits the plate 20 to align itself with the plane of the end of the container 14 when the piston 226 is driven downwardly. A control post 270 is also mounted upon the flange plate 264 and serves to operate the limit switch 228 which, in turn, controls the solenoid valve 230. The test pressure controlled by the valve 230 is applied through the plate by means of piping connection 272.

The plate 20 is equipped with a gasket 274 extending about its circumference, this gasket being adapted to seat upon the outer rim of the container. It will be apparent from this arrangement that when the plate is firmly seated on the container and test pressure supplied through connection 272, that the pressure will flow through the open entrance aperture 276 of the container and thus apply pressure throughout the container.

The space enclosed by the I-beams 254 and suitable upper and lower plates fastened thereto may be conveniently employed as a reservoir of the soapy solution to be applied to the seams during the test. Referring to Figure 6, a suitable pump means 278 may be employed to supply the soapy fluid through a flexible hose 280 which may be manually directed over the seams. It may be mentioned that one of the primary reasons for upending the containers from a horizontal to a vertical position is to permit the seams to run vertically so that the soap solution will tend to run down the seams, rather than run away from it. The latter would be the case if the seams were horizontal.

Figure 10:
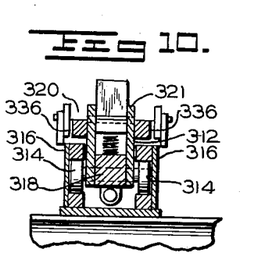
Figure 11:
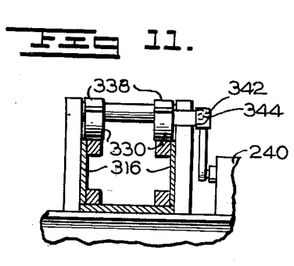
Figure 11 shows a sectional view taken along the line 11—11 of Figure 7.

The shuttle arrangment for positioning the containers below the plate 20 will now be described in detail. The previously mentioned shuttle piston arrangement 216 is connected through an operating rod 310 to drive a carriage 312. This carriage is mounted on suitable wheels 314, which can be ball bearings. These wheels are adapted to run on a pair of tracks 316 in the form of C-channels which face each other. This can best be understood from Figure 10. The spacing between the upper and lower flanges of each track is slightly greater than the diameter of the wheels 314, whereby the wheels may ride on one flange or the other without binding therebetween. The rails 316 are mounted parallel to the slide rails 252 and arranged so that the carriage 312 will be substantially centered under the plate 20.

The carriage 312 is comprised of a main body section 318 and two upstanding side members 320 and 321. A transverse pin 322 extends between the side walls 320 and 321 adjacent the forward end of the carriage 312, and supported on this pin is the ejector dog 214. The dog 214 is normally biased by a spring 324 which extends between the dog 214 and the section 318 of the carriage 312. Spring 324 urges the dog clockwise (Figure 7) against a stop pin 326 mounted in the side walls 320 and 321 of the carriage 312. The similarly mounted injector dog 212 is located at the rearward end of the carriage 312. Both of the dog members are provided with a sloping face extending to the right-hand side of the apparatus, as viewed in Figure 7, and it will be, accordingly, obvious that these dogs will yield when the carriage 312 is moved to the right (Figure 7) when passing under the edges of a container, but will positively engage a container when the carriage 312 is moved to the left.

Figure 7:
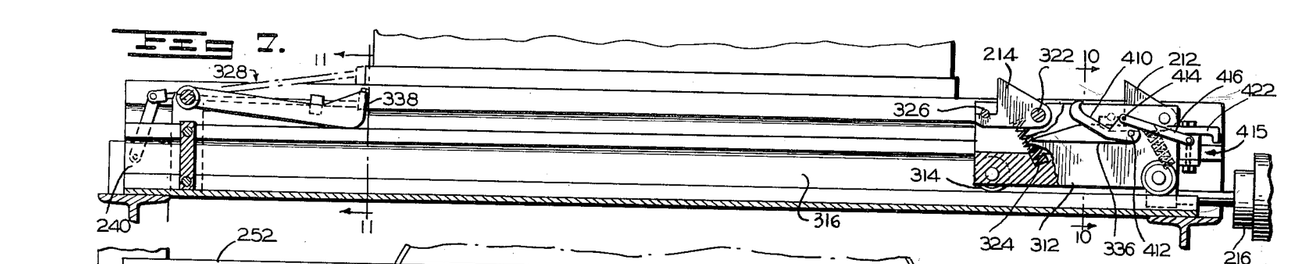
Figure 7 shows a side view of shuttle mechanism employed for intermittently moving containers.
Figure 9:
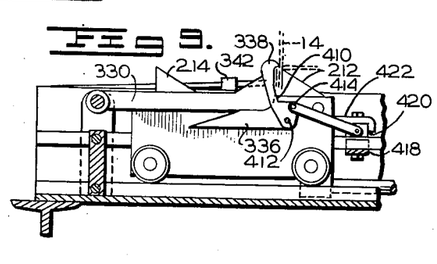
Figures 9 and 10 show details of the shuttle apparatus.

In Figure 5, the shuttle arrangement 210, which includes the carriage 312, is shown at its retracted position, leaving one container under test and a second container (partially shown in cross section) in engagement with the injector dog 212. Now, when the switch 234 (Figure 4) is closed, the carriage 312 will be moved to the left (Figure 5) and the ejector dog 214 will engage the tested container and slide it along the rails 252 and out onto the continuation of the conveyor 18. During this movement, the ejector dog 212 will have moved the next container with which it is engaged toward the test position. The movement of the container into the test position is terminated at precisely the proper place by means of a stop arrangement indicated generally at 328 (Figure 7). This stop arrangement comprises two spaced arms 330 keyed to a common shaft 332. The shaft 332 is then mounted for pivotal movement in suitable bearing supports 334 mounted on the framework of the testing apparatus. The arms 330 are adapted to normally rest upon the upper surfaces of the rails 316. The carriage 312, however, is equipped with wedge members 336 mounted on the outer surface of the side plates 320 and 321 of the carriage 312, and when the carriage 312 is moving to the left (Figure 7), the leading edges of the wedge members 336 pick up the arms 330 of the stop arrangement 328 and will cause the upturned ends 338 of the arms 330 to engage the edge of the container which is being advanced by the injector dog 212. This position is shown in Figure 9.

Figure 8:
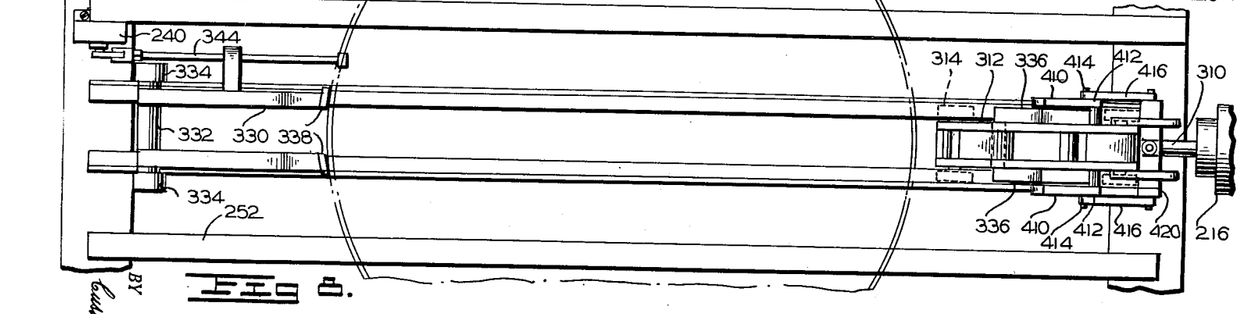
Figure 8 shows a plan view of the shuttle apparatus.

The arrival of the container against the stop arms 330 also serves to actuate the previously mentioned switch 240 in the following manner: One of the arms 330 is provided with a laterally extending lug 340 having an aperture 342 therethrough. A trigger arm 344 rides loosely in the aperture 342 and extends at one end to intercept the container and extends at its other end to the limit switch 240. The trigger rod 344 is of such length that it normally extends a short distance in advance of the stop arm ends 338 (relative to the contour of the container). This may be best understood from Figure 8.

From the apparatus as thus described, it will be clear that the first drum or container to be moved into position by the injector dog 212 will cause the switch 240 to operate the relay 236 to lower the plate 20, to retract the shuttle and apply test pressure through the valve 230. In the meanwhile, the stop arms 330, together with the trigger rod 344, will have assumed their original down position (due to the withdrawal of the wedges 336). The arms 330 may be urged downwardly by gravity or assisted by a suitable spring (not shown). Upon operation of the switch 234 at the completion of the testing operation, the relay 236 will throw the valve 218 to its other position and the plate 20 will be raised and the next container inserted by the shuttle 210. This cycle of operation may be continued indefinitely.

Although not included in the foregoing description, it will be apparent to those skilled in the art that means may be provided for interlocking the upending apparatus 10 and the testing apparatus 12 so that an excess of containers 14 waiting for the testing operation would prevent operation of the upending apparatus if the conveyor 18 lacked sufficient space to receive another upended container. For example, one of the rollers of the conveyor section 18 may be arranged to operate a limit switch 115 to cut off the upending operation.

While in the illustrated embodiment, the shuttle injector dog is placed closely adjacent the ejector dog and engages the inside of the leading edge of the container, nevertheless, it will be apparent that this dog can be spaced from the ejector dog to engage the rear of a container. This may be the preferred form when a flat bottomed object is being handled.

When the containers being tested are relatively heavy and their center of gravity located a substantial distance above the injector dog 212 it may happen that when the shuttle is rapidly accelerated, the forward edge of the container will jump out of engagement with the dog. To counteract this situation, I further provide auxiliary clamping means which I will now describe in detail. Referring first to Figure 5, one of two auxiliary clamping arms designated as 410 is shown pivoted at its lower end to the carriage 312 and with its upper end hooked over the outer edge of the lower rim of the container. The details and operation of these auxiliary clamping members may be best understood by reference now to Figures 7-10.

Each of the clamps 410 is pivoted to the carriage 312 at a point 412 at the trailing end of the wedge members 336 and are spaced a sufficient distance from the sides of the carriage 312 to permit their rotation beside the wedge members 336. The clamping members 410 are also provided with pivot pins 414. These pivot pins are employed to interconnect the clamps 410 with a friction slide structure, this slide structure being designated generally 415, which operates on the tracks 316. The connection to this slide is by means of connecting arms 416. The slide comprises two transverse arms 418 and 420 (Figure 9) urged into resilient clamping action on the upper flanges of tracks 316 by means of a bolt and spring combination. Hooked arms 422 are also provided to limit the movement of the slide away from the carriage 312. These arms are fixedly mounted on the carriage 312 in any suitable manner.

The action of the slide and clamping members is accordingly as follows:

Assuming, for the sake of explanation, that the shuttle is in its advanced position and the container is against the stop arm ends 338 (as shown in Figure 9) when the shuttle begins its retracting movement (to the right in Figure 9) the friction between the slide 415 and the tracks 316 will cause the connecting arms 416 to rotate the clamps 410 counterclockwise about the pivot points 412 to thereby cause the clamps 410 to disengage the container. Due to a relatively short spacing between the pivot points 412 and 414 the disengaging operation will be very rapid and the clamps will clear the rim of the container much before the carriage has moved any substantial distance. This can be fully understood by inspection of the drawings. The clamps 410 will thus remain in their unlatched position when they reach the retracted limit of travel, as illustrated in Figure 7. However, due again to the short distance between the pivot pins 412 and 414, the slightest movement of the carriage in the advancing direction will cause the clamps to rotate clockwise about the pivots 412 and engage the rim of the container much before the container will have opportunity to move upwardly away from the dog 212.

As a further feature of my invention, the apparatus which I have disclosed may be arranged so that leaky containers may be rejected rearwardly onto a conveyor section intended to receive these rejected containers. This rejection conveyor is designated as 510 in Figure 6. Normally, the containers in the testing position are restrained from widthwise movement by two rollers 512 and 514 mounted on vertical axles. However, as shown best in Figures 1 and 5, the upright supporting members 250 are so spaced that a container may be moved between these supports toward the rejection conveyor 510. This movement is facilitated by my arrangement whereby roller 514 is adapted to be moved clear of the container by means of a handle 516. The structure which mounts the roller 514 is pivoted on a post 518 and is caused to move about this pivot to lower the roller 514 by a mechanical linkage comprising a rockable shaft 520 interconnected with the handle 516 by means of a connecting rod 522. It will be clear without further description, that when the handle 516 is rotated the roller 514 is lowered to a position clear of the container and the latter may be shoved sidewise off the rails 252 and onto the conveyor 510.

As an additional feature of my invention, I provide an arrangement to prevent a container following the injected one from getting under the sealing plate 20 and interfering with the sealing of the injected container. As will be seen, particularly by reference to Figures 1, 5 and 6, there is mounted at the outer periphery of the sealing plate 20 an outwardly and downwardly extending stop finger 20'. When the sealing plate 20 is in sealing position, as shown in Figure 5, the downwardly extending leg of the stop finger is disposed in the path of approaching drums which are to be tested. As stated, the purpose of this construction is to prevent the container next in line to be tested from striking or otherwise contacting the container which is being tested.

Also, the vertically extending leg of the stop finger 20' serves to position the approaching drums in the position to be engaged by the shuttle mechanism. The stop finger 20', it will be noted, is pivotally mounted upon the sealing plate 20 so that when the sealing plate descends, if for any reason the lower end of the downwardly extending leg should engage the top of a succeeding container, it will pivot upwardly and thereby be prevented from distorting the top end of the container. Since the shuttle operates rapidly, the following container will not accelerate as rapidly as the injected container and space will thus be normally created between the containers.

The detailed description has been made only for purposes of illustration and the true scope of the invention is to be determined from the appended claim.

I claim:

In conveyor line apparatus for testing large air-tight containers, a section of conveyor extending in a horizontal direction, a supporting structure mounted above said conveyor section, a pneumatic cylinder mounted on said supporting structure with the axis of the cylinder extending vertically, a piston in said cylinder having a piston rod extending downwardly therefrom, a sealing plate attached to the lower end of the piston rod, the sealing plate having an aperture therethrough, shuttle means associated with the conveyor section for moving a container along the conveyor to a test position beneath said sealing plate, first limit switch means operated by the container at the test position to actuate valve means to retract the shuttle means to a retracted position, and to introduce air under pressure above said piston to lower the sealing plates into engagement with the top of the container, second limit switch means positioned to be operated by the sealing plate in its lowered position, said second switch means being connected to actuate valve means for introducing air under pressure through said aperture in said sealing plate and into the container being tested, and manually operable switch means connected to operate said first valve means for applying air under pressure below said piston to raise said sealing plate from the container and to operate said shuttle means to move the tested container along the conveyor and at the same time move another container to the test position.

STANLEY S. JOHNS.

References Cited in the file of this patent

UNITED STATES PATENTS

| Number | Name | Date |
|---|---|---|
| 522,259 | Hodgson | July 3, 1894 |
| 1,726,418 | Aldrich et al. | Aug. 27, 1929 |
| 2,083,827 | Cameron | June 15, 1937 |
| 2,152,244 | Damrow | Mar. 28, 1939 |
| 2,156,877 | Simpson et al. | May 2, 1939 |
| 2,264,515 | Fear | Dec. 2, 1941 |
| 2,293,192 | Campbell | Aug. 18, 1942 |
| 2,391,351 | Schmidt | Dec. 18, 1945 |
| 2,407,062 | Darrah | Sept. 3, 1946 |
| 2,557,357 | Maddox | July 19, 1951 |